United States Patent [19]

Göckler et al.

[11] Patent Number: 4,510,598
[45] Date of Patent: Apr. 9, 1985

[54] DIGITAL TRANSMULTIPLEXER

[75] Inventors: Heinz Göckler; Helmut Scheuermann, both of Backnang, Fed. Rep. of Germany

[73] Assignee: Licentia Patent-Verwaltungs-GmbH, Frankfurt am Main, Fed. Rep. of Germany

[21] Appl. No.: 405,583

[22] Filed: Aug. 5, 1982

[30] Foreign Application Priority Data

Aug. 17, 1981 [DE] Fed. Rep. of Germany ....... 3132378

[51] Int. Cl.³ .............................................. H04J 4/00
[52] U.S. Cl. ......................................... 370/50; 370/70
[58] Field of Search .................................... 370/50, 70

[56] References Cited

U.S. PATENT DOCUMENTS 4,117,541 9/1978 Ali ......................................... 370/50

OTHER PUBLICATIONS

J. L. Daguet, "Methode Simplifiee de Multiplexage en Frequence de Signaux Numeriques Reels", *Cables and Transmission*, vol. 29, (Jul. 1975), pp. 259-265.
"International Conference on Communications 1981", Denver, Co., U.S.A., Jun. 14-18, 1981, Per Channel, Memory Oriented, Transmultiplexer with Logarithmic Processing-Lab Model Implementation and Testing, by C. Kurth et al.
"TDM-FDM Converter", by A. Peled et al., IBM Technical Disclosure Bulletin, vol. 20, No. 10, Mar. 1978.
"IEEE Transactions on Circuits and Systems", vol. CAS-24, No. 9, Sep. 1977, Fettweis et al., on Parasitic Oscillations in Digital Filters Under Looped Conditions.
"Archiv für Elektronik und Übertragungstechnik", Band 29 (1975), pp. 312-314, Meerkötter et al., A New Second-Orer Digital Filter Without Parasitic Oscillations.
"Proceedings of the IEEE", vol. 69, No. 3, Mar. 1981, Crochiere et al., Interpolation and Decimation of Digital Signals–A Tutorial Review.
"Per-Channel, Memory-Oriented, Transmultiplexer with Logarithmic Processing—Architecture and Simulation—", Kurth et al., Bell Telephone Laboratories, ICC, IEEE, 1981.
"1982 International Symposium on Circuits and Systems", Rome, Italy (May 10-12, 1982), Goeckler et al., A Per-Channel Transmultiplexer Applying 11R Filters and Logarithmic Processing.
S. L. Freeny, "TDM/FDM Translation as an Application of Digital Signal Processing", *IEEE Communications Magazine*, vol. 18 (Jan. 1980), pp. 5-15.

*Primary Examiner*—Douglas W. Olms
*Assistant Examiner*—Kenneth I. Rokoff
*Attorney, Agent, or Firm*—Spencer & Frank

[57] ABSTRACT

A system for the digital conversion of a time division multiplex signal into a frequency division multiplex signal wherein the signals of the individual time multiplex channels are filtered by means of bandpass filters, their sampling rates are increased by the factor N to fA and the output signals of these bandpass filters are combined, by means of a summing member, into the frequency multiplex signal, and/or a system for the digital conversion of a frequency multiplex signal into a time division multiplex signal, wherein the digitalized frequency multiplex signal is divided by means of respective bandpass filters into the signals of the individual frequency multiplex channels and their sampling rate fA is reduced by the factor N. The individual bandpass filters (BP) are designed as recursive filters having the transfer function $$H(z) = U2(z)/U1(z) = P(z)/Q(z^N)$$

where $U1(z)$ and $U2(z)$ represent the filter input and filter output spectra respectively, $z = e^{j2\pi f/fA}$, and f is the signal frequency.

5 Claims, 5 Drawing Figures

DIGITAL TRANSMULTIPLEXER

BACKGROUND OF THE INVENTION

The present invention relates to a system for digitally converting a time multiplex signal into a frequency multiplex signal and vice versa, i.e. a transmultiplexer. More particularly the present invention relates to a system for the digital conversion of a time multiplex signal into a frequency multiplex signal wherein the signals of the individual time multiplex channels are filtered by means of respective bandpass filters, their sampling rates are increased by the factor N to fA and the output signals of these bandpass filters are combined, by means of a summing member, into the frequency multiplex signal, and/or to a system for the digital conversion of a frequency multiplex signal into a time multiplex signal, wherein the digitalized frequency multiplex signal is divided by means of respective bandpass filters into the signals of the individual multiplex channels and their sampling rate fA is reduced by the factor N.

Such a digital transmultiplexer is described in the paper by Carl F. Kurth et al, entitled "Per-Channel, Memory Oriented Transmultiplexer With Logarithmic Processing—Architecture and Simulation" published in International Conference on Communications, IEEE, 1981, pages 7.3.1 to 7.3.5.

In this known transmultiplexer a minimum phase filter (FIR) having 434 delay member branches is required for every channel as the digital bandpass filter for interpolation or decimation so as to realize the desired frequency response characteristic (page 7.3.2, left-hand column, second paragraph).

SUMMARY OF THE INVENTION

It is therefore the object of the present invention to provide a transmultiplexer of the above type which requires only uncomplicated bandpass filters.

The above object is accomplished according to the invention in that in a system for digital conversion between time division multiplex signals and frequency division multiplex signals comprising: an input terminal for receiving a digital multiplex signal to be converted; a plurality of digital bandpass filters, one for each channel of a frequency multiplex signal, with each bandpass filter including means for changing the sampling rate of the multiplex channel signal received by the associated bandpass filter to the sampling rate of the converted multiplex channel signal; means connecting the input terminal to the input of each bandpass filter; and means for combining the output signals from each of the bandpass filters to provide the digitally converted multiplex signal; each of the bandpass filters comprises a recursive filter and has a transfer function $$H(z) = U2(z)/U1(z) = P(z)/Q(z^N)$$

wherein $U1(z)$ and $U2(z)$ represent the filter input spectra and filter output spectra respectively, $z = e^{j2\pi f/fA}$, f is the signal frequency processed in the bandpass filter, fA is the sampling rate for the digital frequency multiplex signal, and fA/N is the sampling rate for the time division multiplex signal.

The transmultiplexer may digitally convert a time division multiplex signal to a frequency multiplex signal and/or a frequency division multiplex signal to a time division multiplex signal. In a transmultiplexer system according to the invention wherein a time division multiplex signal is to be digitally converted to a frequency multiplex signal, the means connecting the input terminal includes a demultiplexer which divides the time division multiplex signal into the individual signal channels, each of which is fed to the input of a respective one of the bandpass filters, the means for changing the sampling rate increases the sampling rate of the received time multiplex channel signal by the factor N to fA, and the means for combining comprises a summing member.

Moreover, in a transmultiplexer system according to the invention wherein a digital frequency division multiplex signal is to be digitally converted to a time division multiplex signal, the means for changing the sampling rate decreases the sampling rate of the associated frequency multiplex channel signal by the factor N to fA/N, and the means for combining comprises a time division multiplexer.

According to the preferred embodiment of the invention the transfer function $H(z)$ of each bandpass filter is realized in that the bandpass filter includes the cascade circuit of a transversal filter member having the transfer function $Ps(z)$ and a recursive filter member having the transfer function $$Pp(z^N)/Q(z^N)$$

where $P(z) = Ps(z) \cdot Pp(z^N)$. Moreover, the signals are preferably logarithmically processed in the transversal filter member and/or the recursive filter member.

The solution provided by the present invention offers the advantage of considerably reducing expenditures.

According to a further feature of the invention an advantageous use of the transmultiplexer according to the invention is for a 4-wire section which changes at both ends, by means of branching circuits, into a 2-wire connection, with recursive filter types or structures being provided to assure the stability of the loop formed by the 4-wire section with respect to parasitic oscillations.

The paper by Alfred Fettweis and Klaus Meerkötter, entitled "On Parasitic Oscillations in Digital Filters Under Looped Conditions", published in IEEE Transactions on Circuits and Systems, Vol. CAS-24, No. 9, September 1977, pages 475–481, discusses, in principle, the use of wave digital filters in 4-wire sections of a telephone long-distance line as well as the problems of loop amplification occurring in this 4-wire section. However this paper does not provide any teaching for the use of recursive filter arrangements in transmultiplexers. Moreover, an earlier paper by Meerkötter and Wegener, entitled "A New Second-Order Digital Filter Without Parasitic Oscillations" published in AEÜ, Volume 29, 1975, No. 7/8, pages 312–314 discusses only a novel second order digital filter and presents simple measures for handling internal stability. Both of these general digital filter types may be used in a transmultiplexer, according to the invention, on a 4-wire section as described above, as well as other type filters in which no parasitic oscillations occur in the loop formed by the 4-wire section.

DETAILED DESCRIPTION OF THE PREFERRED EMBODIMENTS

Figure 1:
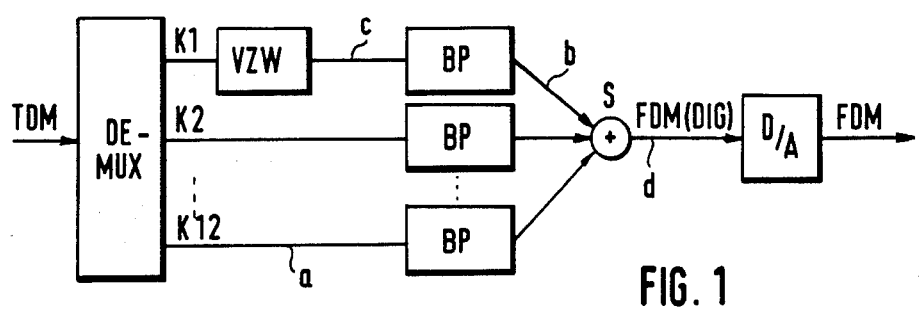
FIG. 1 is a block circuit diagram of a transmultiplexer for 12 channels for converting a time division multiplex signal to a frequency multiplex signal.
Figure 2:
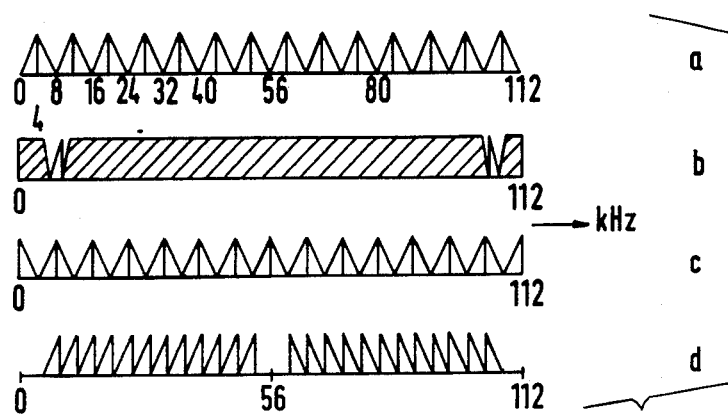
FIG. 2 shows some frequency spectra for a few selected points of the transmultiplexer of FIG. 1.

As shown in FIG. 1, the transmultiplexer includes a demultiplexer DEMUX which divides the time multiplex signal TDM into the twelve individual time multiplex channels with a frequency spectrum a, as shown in FIG. 2a. Since the odd-numbered channels have an inverse spectrum, the spectrum of FIG. 1a is shifted by 4 kHz in each of the odd-numbered channels by supplying the respective channel signal to a circuit VZW which changes the sign of every other sampling value to provide the spectrum c as shown in FIG. 2c. The individual channel signals are then fed to respective bandpass filters BP having respective passbands wherein they are filtered and the sampling rate of the time division multiplex signal, i.e. 8 kHz as shown, is increased by multiplying same by a factor N, (which is 14 in the ilustrated embodiment) to 112 kHz to provide a signal with the spectrum b as shown in FIG. 2b at the output of the bandpass filter. The outputs of the twelve bandpass filters BP are combined in a summing member S to form the digital frequency division multiplex signal FDM with the frequency spectrum d shown in FIG. 2d. The digital frequency multiplex signal d then is converted by means of a digital/analog converter D/A, to the analog frequency multiplex signal FDM.

According to the invention, the bandpass filter BP is designed as a recursive filter having the transfer function $$H(z) = U2(z)/U1(z) = P(z)/Q(z^N)$$

where U1(z) and U2(z) represent the filter input and filter output spectra respectively, $z = e^{j2\pi f/fA}$, f is the signal frequency processed by the bandpass filter, fA is the sampling rate of the frequency multiplex signal and fA/N is the sampling rate of the time multiplex signal. P(z) is the numerator polynomial of the overall transfer function H(z), and $Q(z^N)$ is the denominator polynomial of the same transfer function.

Figure 3:
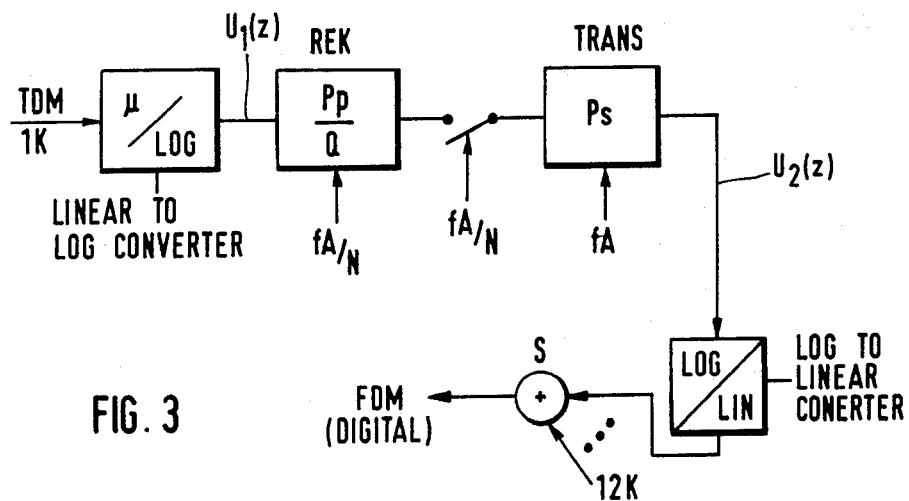
FIG. 3 is the block circuit diagram for an advantageous embodiment according to the invention of a bandpass filter BP of FIG. 1.

FIG. 3 shows an economical realization of such a bandpass filter BP with a cascade connection of a recursive filter member REK and a transversal filter member TRANS, both operating by means of logarithmic signal processing and thus permitting the replacement of expensive multipliers (as required in linear processing) by less expensive adders. The time division multiplex signal TDM coded, for example in $\mu$ curves, from a channel TDM 1K is fed by means of a converter $\mu$/log, which converts the linear signal to a logarithmic signal, to the filter cascade, the transmission behavior being determined by the transfer function $$P_p(z^N)/Q(z^N)$$

of the recursive member REK which operates with a low sampling rate of fA/N = 8 kHz in the illustrated embodiment where fA = 112 kHz and N equals 14. The transversal member TRANS, whose transfer function PS(z) determines the blocking behavior of the filter cascade, operates with the high sampling rate of fA, which equals 112 kHz in the illustrated embodiment, or performs the conversion to the high sampling rate. The members REK and TRANS of the filter cascade are connected by means of a switch which likewise operates in synchronism with the lower sampling frequency, i.e. at fA/N. Of course, this switch can be combined with the transversal member TRANS or integrated therein, as disclosed in the above-cited publication by Kurth et al. At the output of the filter cascade, logarithmic signal processing is changed to linear signal processing in a further converter log/lin. The thus processed linear channel signals are now combined by means of the summing member S into the digital frequency multiplex signal FDM.

Figure 4:
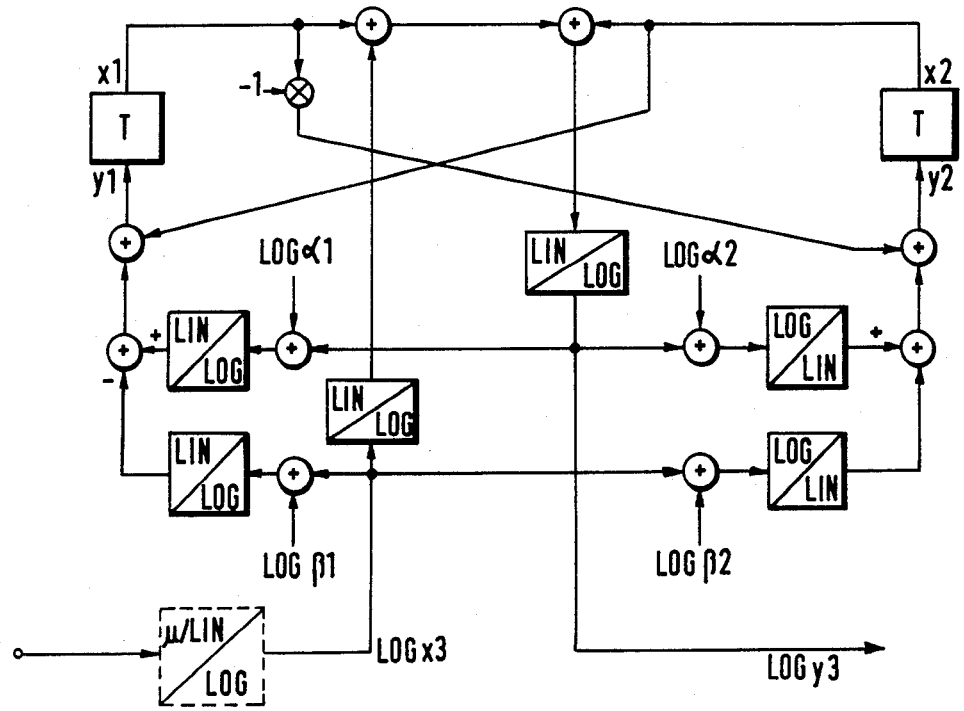
FIG. 4 is a circuit diagram of a second order digital recursive filter modified for logarithmic signal processing and having the structure according to Meerkotter and Wegener.

The recursive portion REK of the filter cascade can most advantageously be realized by degree 2 filter blocks as shown in FIG. 4.

The digital recursive filter of FIG. 4 operates at the lower sampling rate fA/N throughout, where the input and output signals x3 and y3, respectively are digitally coded sequences. The two delays of the 2nd order filter are represented by the blocks "T", where y1 and y2 are the input signals and x1 and x2 are the respective output signals delayed by T = N/fA. The blocks lin/log or log/lin respectively are used for the conversion of signal formats from linear to logarithmic or from logarithmic to linear representation, respectively. The realization is described in detail by the above cited paper of Kurth et al. $\alpha 1$, $\alpha 2$, $\beta 1$ and $\beta 2$ represent the filter coefficients, which must be provided in logarithmic format.

An embodiment of the transversal filter TRANS including the switch for sampling at fA/N of FIG. 3 is described in detail by Crochiere and Rabiner, "Interpolation and decimation of digital signals—a tutorial review", published in Proc. IEEE, vol. 69, March 1981, pp. 300–312.

Figure 5:
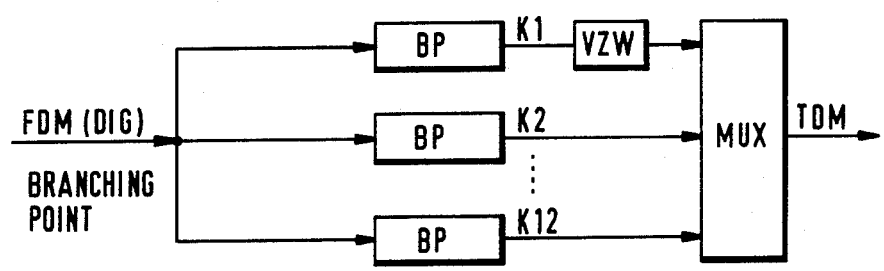
FIG. 5 is a block circuit diagram of a transmultiplexer for twelve channels for converting a frequency division multiplex signal to a time division multiplex signal.

FIG. 5 shows a transmultiplexer for converting a digital frequency multiplex signal to a time division multiplex signal. As shown the digital frequency multiplex signal FDM (dig) is fed to the input of each of the twelve bandpass filters BP according to the invention wherein the sampling rate fA of the signals is reduced by the factor N to fA/N and wherein the signals are filtered in order to separate the frequency multiplex signal into the signals of the individual time division multiplex channels. The spectra of the signals in the odd-numbered channels are again shifted by the member VZW as in the transmultiplexer of FIG. 1 and the signals of the twelve channels are fed to a time division multiplexer MUX which provides the time division multiplex signal TDM at its output.

The bandpass filters BP of FIG. 5 can be realised according to FIG. 3, where the direction of the signal flow has to be inverted and the summing member S is replaced by a branching point.

It will be understood that the above description of the present invention is susceptible to various modifications, changes and adaptations, and the same are intended to be comprehended within the meaning and range of equivalents of the appended claims.

What is claimed is:

1. In a system for digital conversion between time division multiplex signals and frequency division multiplex signals comprising: an input terminal for receiving a digital multiplex signal to be converted; a plurality of digital bandpass filters, one for each channel of a frequency multiplex signal, with each said bandpass filter including means for changing the sampling rate of the multiplex channel signal received by the associated bandpass filter to the sampling rate of the converted multiplex channel signal; means connecting said input terminal to the input of each of said bandpass filters; and means for combining the output signals from each of said bandpass filters to provide the digitally converted multiplex signal; the improvement wherein each of said bandpass filters comprises a recursive filter and has a transfer function $$H(z) = U2(z)/U1(z) = P(z)/Q(z^N)$$

wherein U1(z) and U2(z) represent the filter input spectra and filter output spectra respectively, P(z) and Q($z^N$) are the numerator polynomial and the denominator polynomial respectively of the transfer function H(z), $z = e^{j2\pi f/fA}$, f is the signal frequency processed in the bandpass fitter, fA is the sampling rate for the digital frequency multiplex signal, and fA/N is the sampling rate for the time division multiplex signal.

2. A system as defined in claim 1 wherein a time division multiplex signal is to be digitally converted to a frequency multiplex signal and wherein: said means connecting said input terminal includes a demultiplexer which divides the time division multiplex signal into the individual signal channels, each of which is fed to the input of a respective one of said bandpass filters; said means for changing the sampling rate increases the sampling rate of the received time multiplex channel signal by the factor N to fA; and said means for combining comprises a summing member.

3. A system as defined in claim 1 wherein a digital frequency division multiplex signal is to be digitally converted to a time division multiplex signal and wherein: said means for changing the sampling rate decreases the sampling rate of the associated frequency multiplex channel signal by the factor N to fA/N; and said means for combining comprises a time division multiplexer.

4. A system as defined in claim 2 or 3 wherein said transfer function H(z) of each said bandpass filter is realized in that said bandpass filter includes the cascade circuit of a transversal filter member having the transfer function Ps(z) and a recursive filter member having the transfer function $$Pp(z^N)/Q(z^N)$$

where $P(z) = Ps(z) \cdot Pp(z^N)$.

5. A system as defined in claim 4 wherein in each said bandpass filter, the signals are logarithmically processed in at least one of the said transversal filter and recursive filter members.

* * * * *